(No Model.) 3 Sheets—Sheet 1.
H. C. STONE.
DYNAMOMETER.
No. 504,286. Patented Aug. 29, 1893.
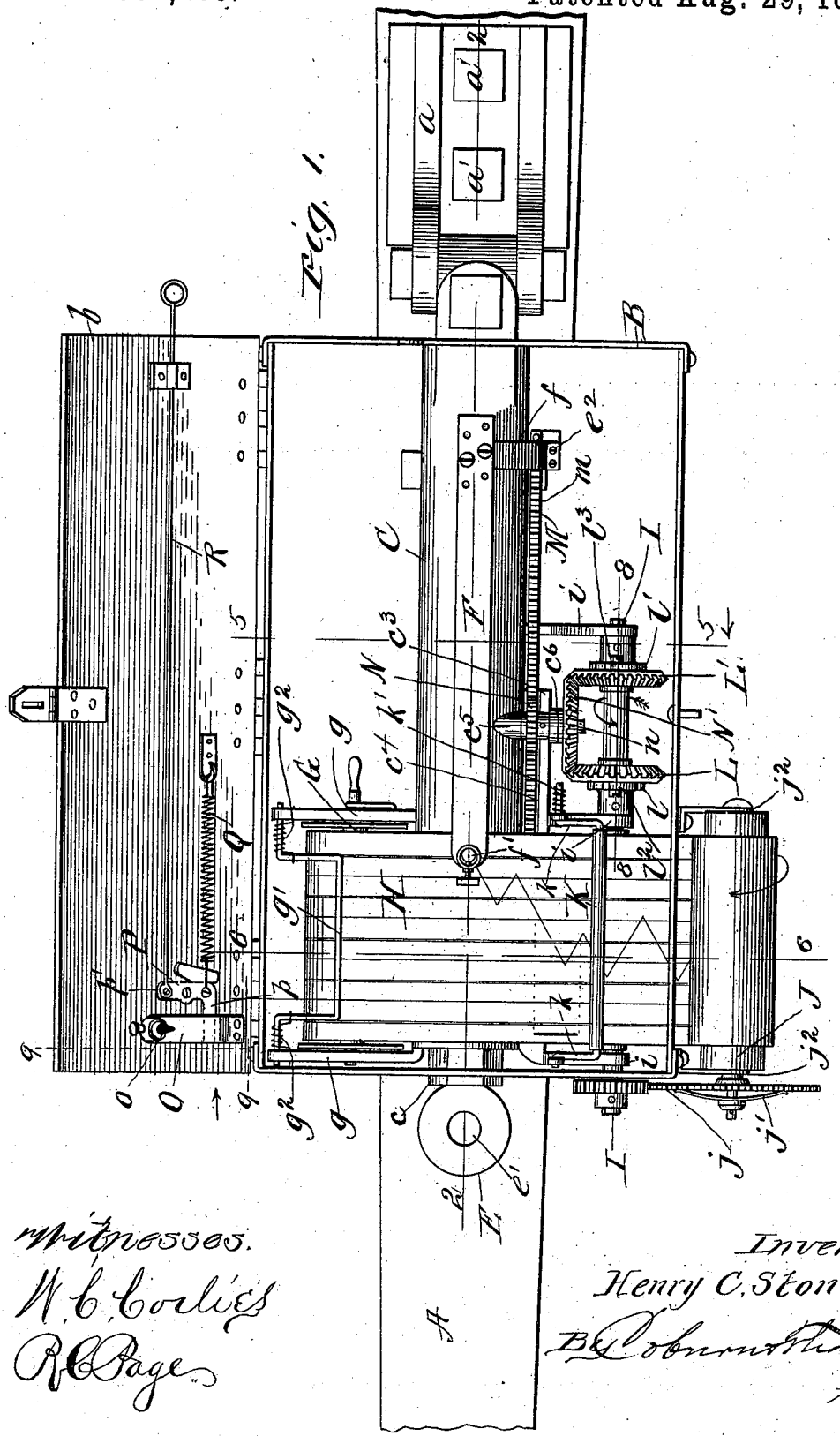
Witnesses.
W. C. Coolies
R. C. Page
Inventor:
Henry C. Stone (No Model.) 3 Sheets—Sheet 2.
H. C. STONE.
DYNAMOMETER.
No. 504,286. Patented Aug. 29, 1893.
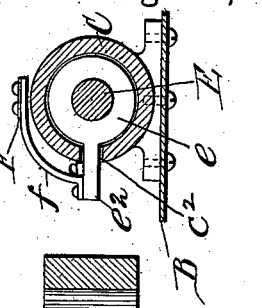
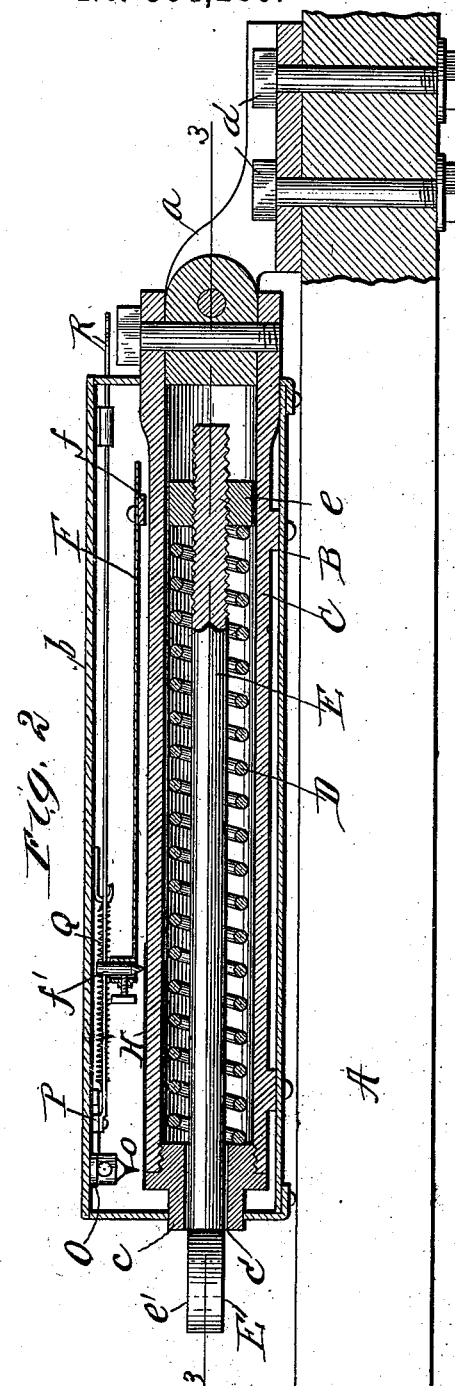
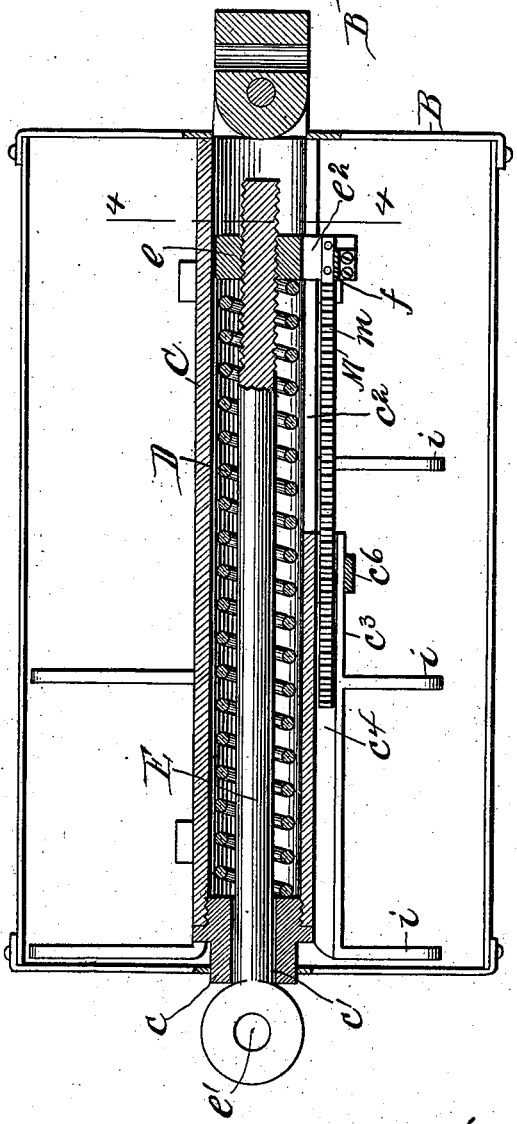
Witnesses.
H. C. Coties
R. C. Page
Inventor.
Henry C. Stone
By Coburn & Thacher
Attys.

(No Model.) 3 Sheets—Sheet 3.
H. C. STONE.
DYNAMOMETER.
No. 504,286. Patented Aug. 29, 1893.
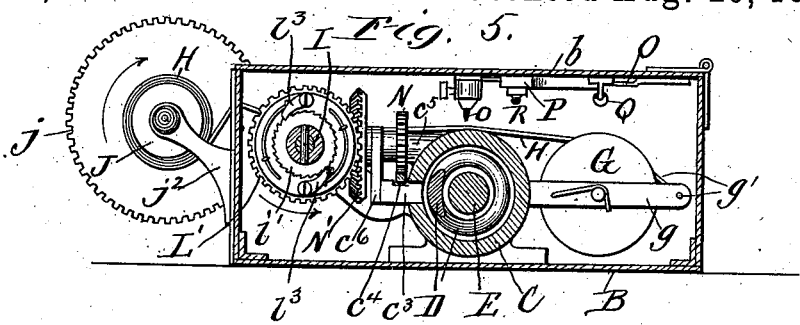
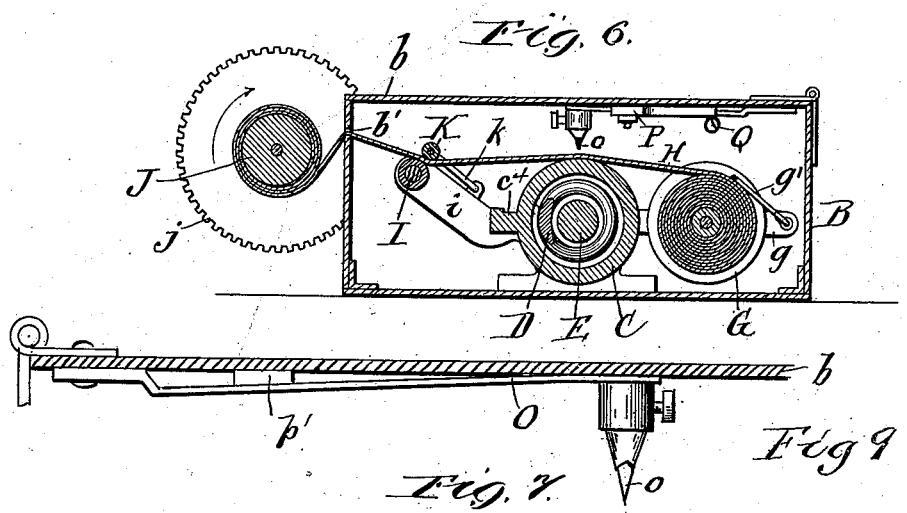
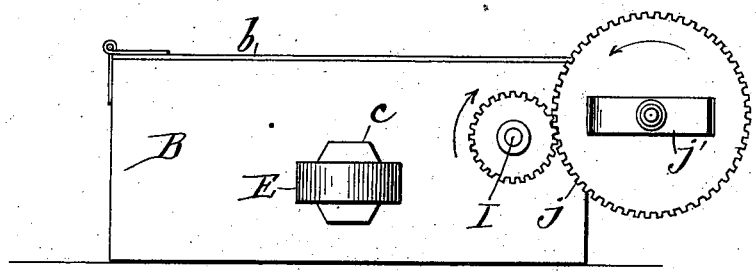
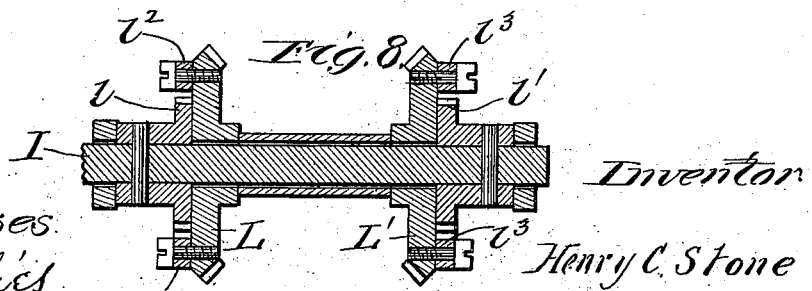
Witnesses
W. C. Colles
R. C. Page
Inventor
Henry C. Stone
By Coburn & Thacher
Attys

UNITED STATES PATENT OFFICE.

HENRY C. STONE, OF KANSAS CITY, MISSOURI, ASSIGNOR TO OLIVE A. STONE, OF SOUTH EVANSTON, ILLINOIS.

DYNAMOMETER.

SPECIFICATION forming part of Letters Patent No. 504,286, dated August 29, 1893.

Application filed December 27, 1892. Serial No. 456,422. (No model.)

*To all whom it may concern:*

Be it known that I, HENRY C. STONE, a citizen of the United States, residing at Kansas City, in the county of Jackson and State of Missouri, have invented certain new and useful Improvements in Dynamometers, which are fully set forth in the following specification, reference being had to the accompanying drawings, in which—

Figure 1 represents a plan view of a dynamometer embodying my invention with the lid of the inclosing box thrown open; Fig. 2, a section of the same taken on the line 2—2 of Fig. 1, with the lid closed; Fig. 3, a plan section of the same taken on the line 3—3 of Fig. 2; Fig. 4, a detail cross section taken on the line 4—4 of Fig. 3; Fig. 5, a cross section taken on the line 5—5 of Fig. 1, with the box closed; Fig. 6, a similar section taken on the line 6—6 of Fig. 1; Fig. 7, a front end elevation of the same; Fig. 8, a detail section taken on the line 8—8 of Fig. 1; Fig. 9, a detail section of the cover of the box on the line 9—9 of Fig. 1. Figs. 1 to 7 inclusive are upon one and the same scale; but Figs. 8 and 9 are upon another and enlarged scale.

My invention relates to dynamometers, especially such as are intended for use upon harvesters, though I do not wish to be understood as limiting the improvements to a dynamometer for any particular use. The invention, however, relates particularly to a registering dynamometer, in which the variations in draft, or other force, are constantly indicated upon a suitable recording strip, or sheet.

The invention consists in certain improvements, for indicating and continuously recording the amount of power, or force, exerted, as will be hereinafter explained.

I will now proceed to describe in detail the construction and operation of a dynamometer, in which I have embodied my invention in one practical way, and in claims following said description will designate more definitely the improvements which I believe I have invented and which I wish to secure by Letters Patent.

In the drawings I have shown the dynamometer constructed for application to a harvester and, in fact, as actually applied thereto, A representing the pole of a harvester to which the dynamometer is attached by means of a clip $a$ fastened to the pole by bolts $a'$, or in any other suitable way. For convenience I provide an inclosing box, or case, B, though this is not an essential part of the operative devices of the instrument. These operative devices are mostly inclosed within the box, which, as shown in the drawings, is shallow and quite wide, and provided with a hinged lid, or cover, $b$. A strong tube C extends through this box lengthwise and at its rear end is hinged to the clip $a$, as seen in Fig. 2. At the front end of the tube there is fitted a screw-plug $c$, which passes out just through the front end of the box, and is perforated centrally by an aperture $c'$. The power spring D is arranged within this tube, as shown in the drawings being a coiled, or spiral, spring. The draft rod E is inserted through the aperture in the plug, in which it finds a bearing and is free to slide back and forth, and at its inner end is threaded to receive a nut $e$ between which and the plug, at the front end of the tube, the spring is held, the latter surrounding the rod, as seen in Fig. 3. The front end of the draft-rod, just outside of the box, or case, terminates in a ring $e'$, which provides means for the attachment of the draft to the rod. This is ordinary construction and, obviously, the outward movement of the rod is resisted by the spring, which is compressed by any such movement.

The tube C is provided at one side with a slot $c^2$ running from the rear end of the tube, toward the forward end thereof, a distance at least equal to the travel expected of the draft rod. The nut $e$ on the rear end of the rod is provided with a short arm, or lug, $e^2$, which projects out at one side of the nut and is adapted to fit the slot in the side of the tube, through which it projects and along which it is adapted to travel.

The indicator arm, or index, is a spring F, which is mounted at its rear end on a curved arm $f$, which is secured at one end on the projecting lug $e^2$ and thence bends upward over the outside of the tube terminating just above the latter, as seen in Fig. 4. The index arm F extends, from its point of fastening to this carrying arm, forward above the tube and over a considerable portion of its length, and at its free front end carries a pencil, or marker, $f'$. It is obvious from this description that the indicator, with its marker, travels back and forth with the draft rod in the tube and its movement corresponds in extent with that of the latter. If, then, a card, or strip of paper, properly prepared and divided, is arranged underneath the path of travel of this indicator, the extent of movement of the draft rod at any one time will, of course, be indicated thereon. And, if the paper itself is also caused to travel in proper relation to the movement of the indicator, it is obvious that variations in the movement of the draft rod will be traced continuously, and so, a continuous irregular track will be made upon the paper, which correctly indicates the variations in the strain brought to bear on the draft rod. I have provided mechanism for accomplishing precisely these results. At the front end of the box and at one side of the tube I mount a short reel, or drum, G, parallel with the tube. In the drawings this reel is shown mounted on arms $g$ supported from the tube itself. A strip of paper H, of any desired length, is wound upon this reel and the latter is provided with a spring bail $g'$ mounted in the outer ends of the arms $g$ and provided with retaining springs $g^2$, which operate to turn the bail down upon the surface of the paper on the reel, as seen in Fig. 1, thus serving to provide an even tension upon the paper on the reel. The strip of paper is divided and marked in any ordinary way so as to present a kind of scale indicating different pounds of force at different points across the strip. The graduations on the paper must, of course, correspond with the actual results caused by the compression of the spring. This prepared sheet of paper is carried from the reel over the tube on which it rests, as seen in Fig. 5, and thence a little beyond the tube on the other side thereof over a shaft I and thence out through a suitable slot $b'$ to a second drum J on the outside of the box and lying alongside the latter, as seen in Fig. 1. The paper web, as it is drawn from the reel G is intended to be wound on the reel J. The shaft I is considerably longer than the width of the web of paper and extends rearward some distance from the latter, as seen in Fig. 1, being mounted in bracket arms $i$, supported by the tube. A roller K is mounted loosely on a bail $k$, which is hinged at its arms to two of the brackets $i$, and a spring $k'$ is applied to the bail in such a way as to normally hold the latter down upon the web of paper against the shaft I. Two beveled gears L L' are mounted loosely on the rear portion of the shaft I at a little distance apart, as seen in Fig. 1. Ratchet disks $l\ l'$ are fastened to the shaft on the outside of each wheel and the latter are provided respectively with spring pawls $l^2\ l^3$ adapted to engage with the respective ratchets. It will then be seen that when one of the pawls on one of the wheels engages with the corresponding ratchet the rotation of this wheel will turn the shaft. The two sets of pawls and ratchets are arranged to act in the same direction, that is to clutch the wheels to the shaft to turn the latter in one direction only; so that when one wheel is turning in a direction to rotate the shaft, the other may be turned in the opposite direction idly on the latter.

At the front end of the shaft I outside of the box there is a pinion which engages with a gear wheel $j$ mounted loosely on the forward end of the shaft of the drum J and clutched thereto by a friction spring $j'$. This is a bow spring set on the shaft so that its ends will rest on the face of the wheel, and the tension of the spring against the wheel is adjusted by a nut on the shaft in a well known way. The shaft of this drum J is supported by arms $j^2$ extending from the side of the box.

On the same side of the tube as the slot $c^2$ there is a narrow horizontal ledge $c^3$, commencing at about the front end of the slot and extending forward to the end of the tube. This ledge is provided with a shallow groove $c^4$ within which a rack-bar, or strip, M is arranged to slide back and forth, this bar being fastened at its rear end to the projecting arm $e^2$ on the nut $e$ and is, therefore, reciprocated lengthwise by the reciprocation of the draft rod which carries the nut. This rack bar is provided with teeth $m$ on its upper surface and with these a gear pinion N is arranged to engage. This pinion is fixed on a short shaft $n$ mounted in a boss $c^5$ on the tube and an upright arm $c^6$ on the ledge. On the outer end of this short shaft there is fixed a beveled gear wheel N', which is arranged in the space between the two beveled gears L L' and so as to engage with each, as seen in Fig. 1. Now, it is obvious that the reciprocation of the rack bar, caused by the reciprocating movement of the draft rod, will rotate the pinion N in one direction, or the other, according to the movement of the bar, and that this movement will produce a corresponding rotation of the beveled gear N', which in turn will rotate both of the beveled gears L L', but in opposite directions, so that only one of the said wheels is operative to revolve the shaft I, the other one turning loosely on the shaft, while on the reverse movement of the rack bar the reverse effect will be produced on the said wheels L L', the one formerly operative becoming inoperative, while the formerly inoperative wheel is now clutched to the shaft and becomes operative. Now, the relative construction and arrangement of these parts is such that the wheels are clutched to the shaft I only in the direction to turn the shaft outward, as indicated by the arrow in Fig. 1, so that the outward movement of the draft rod results in the turning of the front wheel L in the direction to rotate the shaft I, while the reverse movement of the bar will turn the rear wheel L' in the same direction, and their idle motion will be reversed in the same way. However the rack bar is moved, therefore, the shaft I will always be rotated outward, and by the connections already explained, it will be seen that this results in turning the outside drum, or reel, in one direction always and that in the direction required for drawing the web of paper from the inside drum and winding it up on the outside. This produces a constant feed of the web of paper along underneath the marker when the draft rod is moved in either direction; and the marker resting upon the paper immediately above the tube makes a continuous tracing thereon, as indicated in Fig. 1, which correctly shows the travel of the draft rod and so indicates the varying force applied to the latter. It will be understood, of course, that the web of paper must be properly graduated for this purpose and that the gearing, described above, must be constructed relatively, so that all these parts shall move in harmony, as required to effect the results just mentioned. Now, if the dynamometer be attached to a harvester, as mentioned above and indicated in the drawings, and the team is attached to the draft rod, the irregular tracing on the paper will indicate the power required to move the machine and the variations thereof at different points of work.

It is often desirable to determine the exact force required at a certain point in the operation of any machine; for instance, it is often desired to determine just what power is required at the point of binding the bundle on a harvester. I have provided a device for this purpose. A spring indicating arm O is fastened at one end to the inside of the lid, as seen in Fig. 1, and is arranged to extend transversely of the box to a point just over the tube and above the record strip of paper; this arm is provided at its outer, or free end, with a pencil, or any other usual indicator $o$. Normally the arm lies in an elevated position sufficient to hold the marker up away from the paper, as seen in Figs. 5 and 6. A bell crank lever P is pivoted to the inside of the box by one of its arms $p'$; the other arm $p$ is arranged to just reach in between the arm O and the lid, and is slightly beveled, or wedge-shaped, so that when forced in above this indicator arm it will depress it and so bring the marker down on the paper. A retracting spring Q is attached to the lid, being arranged to hold the latter outward and away from the indicator arm normally. To the outer end of the arm $p'$ a rod R is fastened which is carried along underneath the lid and out at the rear end of the box where it is connected in such a way that when the binder is thrown into operation to bind the bundle the rod will be pulled forward, thereby turning the lever inward and forcing down the marker $o$, and so indicating on the record strip the exact point at which a bundle was bound, thus providing for the ready determination of the force required to operate the machine at this point. The same idea may be carried out as to other points of operation in a harvester, or any other machine to which the dynamometer may be applied.

I do not wish to be understood as limiting my invention to all the special devices above described, or to the special construction and arrangement of all these parts, for there may be changes in these particulars, and yet the instrument operate upon substantially the same principle.

The mechanism whereby the feeding of the record strip is produced by the movement of the draft rod, and always in the same direction however the direction of the draft rod movement may be varied, and the devices for making a special indication at some special point in the operation of a machine, may also be changed, and without losing the controlling principle on which the instrument is constructed and operated. These are mentioned as instances where changes may be effected and still retain the controlling features of my invention.

Having thus described my invention, what I claim as new, and desire to secure by Letters Patent, is—

1. In a dynamometer, a draft rod, in combination with a resistance spring, a record sheet, a recording marker connected to and moving with the draft rod, and mechanism actuated by the reciprocation of the draft rod to feed the record sheet always in one direction, substantially as described.

2. In a dynamometer, a spring resisted draft rod, in combination with a recording marker connected to and moving with the draft rod, a record sheet arranged to travel underneath said marker, mechanism for feeding the sheet in one direction actuated by the movement of the draft rod, a secondary marker suspended above the record sheet and normally out of connection therewith, and mechanism for depressing the secondary marker upon the record sheet at any fixed point in the operation of the machine, substantially as described.

3. In a dynamometer, the tube C provided with slot $c^2$, in combination with draft rod E, resistance spring D, arm $e^2$ carried by said draft rod and projecting through said slot in the tube, index arm F connected to and carried by said arm $e^2$, and record sheet H, substantially as described.

4. In a dynamometer, a graduated record sheet H, in combination with drums, or rollers, G and J, driven shaft I geared to the drum J, mechanism for driving said shaft I by the movement of the draft rod, and a marker connected with the draft rod and arranged to travel transversely of the record sheet, substantially as described.

5. In a dynamometer, a record sheet H, in combination with drums G and J, the shaft I geared to the drum J, gear wheels L L' mounted loosely on said shaft and connected thereto by spring pawls, a gear wheel engaging with each of said gears, and mechanism for driving said gear wheel by the reciprocation of the draft rod, substantially as described.

6. In a dynamometer, the draft rod E, in combination with the resistance spring D, record sheet H mounted on suitable drums, shaft I whereby feed movement is given to said sheet, beveled gears L L' mounted loosely on said shaft and clutched thereto in one direction, the beveled gear N' engaging with both L L', pinion N mounted on the shaft of N', and rack bar M carried by the draft rod and engaging with said pinion N, substantially as described.

7. In a dynamometer, the tube C provided with slot $c^2$, in combination with the draft rod E provided with arm $e^2$ projecting through said slot, resistance spring D, ledge $c^3$ on one side of the tube, rack bar M connected to the arm $e^2$ and supported on said ledge, shaft $n$ carrying gears N and N', feed shaft provided with gears L L' clutched to the feed shaft in one direction, record strip H, drums G and J on which the record sheet is mounted, gearing connecting drum J with the shaft I, and a recording marker $f'$ connected and moving with the draft rod, substantially as described.

8. In a dynamometer, a record sheet H, in combination with drums G and J, gear wheel $j$ mounted loosely on the shaft of drum J, friction spring $j'$ fixed on the same shaft and arranged to bear upon the gear $j$, and mechanism whereby said feed shaft is driven by the movements of the draft rod, substantially as described.

9. In a dynamometer, a spring resisted draft rod, in combination with a record sheet H, mechanism whereby said sheet is continuously fed in one direction by the movements of the draft rod, a marker carried by the draft rod and in constant connection with the record sheet, the supplementary yielding marker O normally out of connection with the record sheet, lever P, spring Q, and actuating rod R, substantially as described.

HENRY C. STONE.

Witnesses:
ROBERT C. PAGE,
DWIGHT S. BRYANT.